United States Patent
Kremp

(10) Patent No.: US 8,792,638 B2
(45) Date of Patent: Jul. 29, 2014

(54) METHOD TO VERIFY THAT A USER HAS MADE AN EXTERNAL COPY OF A CRYPTOGRAPHIC KEY

(71) Applicant: Juergen Kremp, Walldorf (DE)

(72) Inventor: Juergen Kremp, Walldorf (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/687,203

(22) Filed: Nov. 28, 2012

(65) Prior Publication Data
US 2014/0146965 A1    May 29, 2014

(51) Int. Cl.
*H04L 9/08*    (2006.01)

(52) U.S. Cl.
CPC ........................... *H04L 9/08* (2013.01)
USPC ............................................. 380/44

(58) Field of Classification Search
CPC .................... H04Q 5/22; H04L 9/00
See application file for complete search history.

(56) References Cited

U.S. PATENT DOCUMENTS

| | | | |
|---|---|---|---|
| 2004/0066278 A1* | 4/2004 | Hughes et al. | 340/10.1 |
| 2008/0159534 A1* | 7/2008 | Rager et al. | 380/247 |
| 2010/0017604 A1* | 1/2010 | Husa | 713/168 |
| 2013/0160083 A1* | 6/2013 | Schrix et al. | 726/3 |
| 2013/0218768 A1* | 8/2013 | Leber, Mike | 705/44 |

FOREIGN PATENT DOCUMENTS

EP    1253500 A1 * 10/2002

OTHER PUBLICATIONS https://www.google.com/ Jan. 1, 2008 2 pages.*
http://www.strategycore.co.uk/databank/games/ufo-enemy-unknown/copy-protection-codes/ Jun. 14, 2011 4 pages.*

* cited by examiner

*Primary Examiner* — Jeffrey Pwu
*Assistant Examiner* — Wasika Nipa
(74) *Attorney, Agent, or Firm* — Schwegman, Lundberg & Woessner, P.A.

(57) ABSTRACT

A cryptographic key for a client is generated at a server. The cryptographic key has a key identification and a corresponding key value. The key identification and the corresponding key value are presented to the client. A query of a portion less than the key value for the client is generated after the key identification and the corresponding key value are presented to the client. Entries from the client are received in response to the query. The cryptographic key is activated after the entries are validated.

14 Claims, 9 Drawing Sheets

METHOD TO VERIFY THAT A USER HAS MADE AN EXTERNAL COPY OF A CRYPTOGRAPHIC KEY

FIELD

The present disclosure relates generally to a cryptographic key, and in a specific example embodiment, to a method to verify that a user has made a copy of the cryptographic key.

BACKGROUND

Computer systems can generate cryptographic keys that can be used to encrypt data or verify the validity of software. However, it is important that cryptographic keys are backed up by the user or the system administrator when the computer system needs to be restored. Computer systems typically assume that the user or the system administrator has saved a copy of the cryptographic key after presenting the cryptographic key. During a verification process, the user or system administrator can copy the text value of the cryptographic key and paste the text value in the verification process without having made a copy of the cryptographic key outside the computer system (e.g., by writing it down on a piece of paper).

If the user were to save a copy of the text value of the cryptographic key in another file on the computer system, saving such file on the same computer system may prove to be futile in case the computer system is compromised, for example, by a computer virus, and the computer needs to be reimaged.

BRIEF DESCRIPTION OF DRAWINGS

The appended drawings merely illustrate example embodiments of the present invention and cannot be considered as limiting its scope.

DETAILED DESCRIPTION

Figure 1:
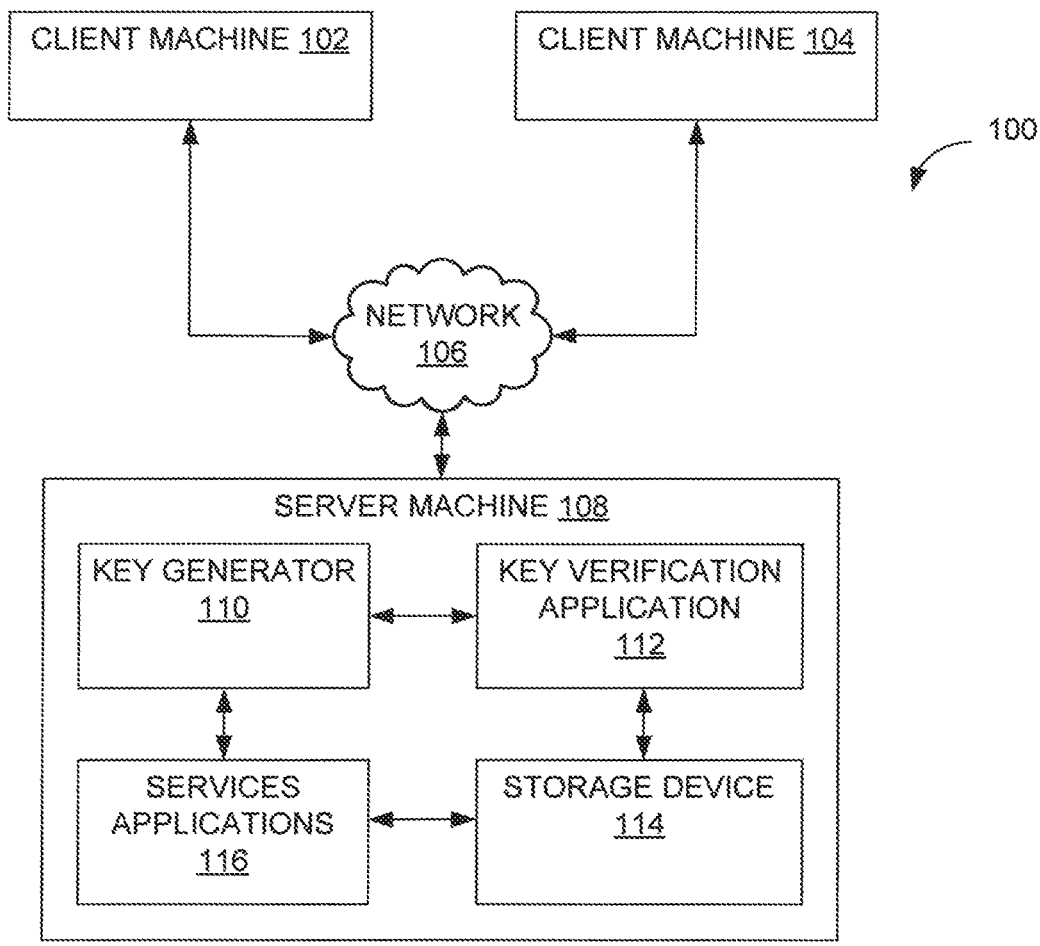
FIG. 1 is a block diagram illustrating an example of a system in which embodiments may be practiced.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

Example systems and methods to generate and verify a cryptographic key are described. In one example embodiment, a cryptographic key for a client may be generated at a server. The cryptographic key may include a key identification and a corresponding key value. The key identification and the corresponding key value may be presented to the client. The server generates a query of a portion of the key value less than the full key value for the client after the key identification and the corresponding key value are presented to the client. The client submits to the server entries that may include letters and/or numbers corresponding to the key value in response to the query. The server activates the cryptographic key after the entries from the client are validated.

In one example embodiment, the server includes a key generator and a key verification application. The key generator may generate a cryptographic key for the client. The cryptographic key may include a key identification and a corresponding key value. The key generator may also communicate the key identification and the corresponding key value to the client via a computer network.

In one example embodiment, the key verification application may generate a query of a portion of the key value for the client. The key verification application may then receive entries from the client in response to the query. The entries may include letters and/or numbers corresponding to the key value. The key verification application may activate the cryptographic key after validating the entries from the client. A storage device may store the cryptographic key after the entries from the client are successfully validated.

In one example embodiment, the key generator generates a first display at the client. The first display may include the key identification and the corresponding key value. In response to receiving a first acknowledgement from the client that the key identification and the corresponding key value have been generated in the first display, the key generator may replace the first display with a second display comprising the query of the portion of the key value.

In one example embodiment, the key verification application selects random locations in the key value. The key value may include a sequence of a combination of letters and numbers. The key verification application may query a corresponding value at the random locations, and receive the entries for the random locations from the client. The key verification application may select the first location and the last location in the key value to query (e.g., the first letter or number of the key value, and the last letter or number of the key value). The key verification application also generates a single button in the second display that replaced the first display. The single button may be configured to submit the queried corresponding values at the random locations from the client to the server. The key verification application may validate the entries from the client by comparing the entries for the random locations with the corresponding value at the random locations in the key value.

In one example embodiment, the key generator may store the cryptographic key in the server after the entries from the client are successfully validated. On the other hand, the key verification application may discard the cryptographic key after unsuccessfully validating the entries from the client. After the cryptographic key is discarded, the key generator may generate and present a new cryptographic key to the client. The key verification application may generate a second query of a portion of the new cryptographic key for the client after presenting the new cryptographic key. The key verification application may then receive a new set of entries from the client in response to the second query, and activate the new cryptographic key after validating the second new set of entries.

Example Computer Network System

FIG. 1 is a block diagram depicting an example environment 100 within which example embodiments may be deployed. The environment 100 may include one or more client machines (e.g., client machines 102, 104). For example, the client machines 102, 104 may be a personal computer, or a mobile computing device of participants of a business task.

In one embodiment, the client machine 102 may execute a software application to access secured data or applications from a server machine 108 via an encryption key mechanism. For example, the client machine 102 may be provided with access to an application in the server machine 108 upon verification of a valid encryption key associated with the application and the client machine 102. In another example, the software application on the client machine 102 may load a user interface to access secured data on the server machine 108. The software application may be for example a word processing application, a business application, a spreadsheet application, and so forth.

In another embodiment, the client machine 102 may execute a web browser (not shown) through which the client machine 102 may access secured data from the server machine 108. For example, the web browser may be any browser commonly used to access a network of computers such as the World Wide Web. The web browser may load a user interface at the client machine 102 to connect the client machine 102 with services or data from the server machine 108.

As previously described, the environment 100 also includes the server machine 108 that provides services, applications, and/or data to the client machine 102 upon validation of the client machine 102. The server machine 108 may execute one or more applications: a key generator 110, a key verification application 112, and services application 116. The services application 116 may include, for example, business applications services or any other types of application hosted on the server machine 108 and accessible by the client machine 102. In one example embodiment, the key generator 110, the key verification application 112, and the services application 116 may be stored in a storage device 114 (e.g., hard disk, solid state memory, read only memory, or any other type of storage device).

In one example embodiment, the server machine 108 may generate and verity a cryptographic key. The key generator 110 may generate a cryptographic key for the client machine 102. The cryptographic key may include a key identification and a corresponding key value comprising of a series of letters and numbers such as in a hexadecimal base. The key generator 110 may present the key identification and the corresponding key value to the client machine 102. The key verification application 112 may generate a query of a portion of the key value for the client machine 102 after the key generator 110 presents the key identification and the corresponding key value to the client machine 102. The key verification application 112 may receive entries from the client machine 102 in response to the query and verify the validity of the entries by comparing the entries with the key value of the cryptographic key. If the entries match the key value, the cryptographic key is activated, i.e., after the entries are validated.

The client machines 102, 104, and the server machine 108 may be coupled to each other via a network 106. The network 106 enables communication between systems. Accordingly, the network 106 may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP). HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The network 106 may be implemented using the Internet, a wide area network (WAN), a local area network (LAN), or any suitable combination thereof.

It should be noted that the user interface for the key generator 110 and the key verification application 112 may be generated at the server machine 108 and as such, can be accessible from any client machine. In other words, the client machine 102 may open a web browser and receive the cryptographic key and the query for values of the cryptographic key in the web browser. In another embodiment, the client machine 102 may execute an application configured to communicate with the server machine 108. The application can be also used to receive the cryptographic key and the query for values of the cryptographic key inside the application.

Example of Key Generation and Verification

Figure 2:
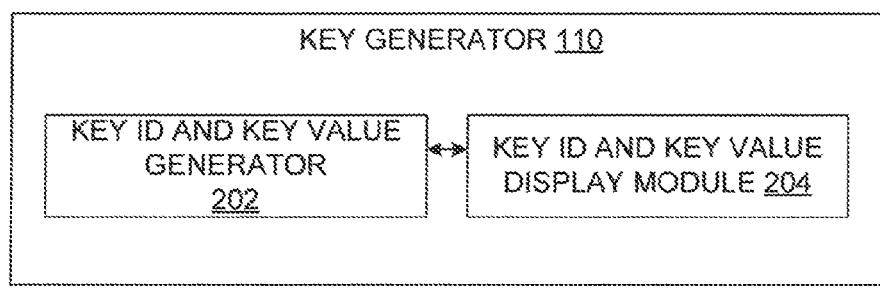
FIG. 2 is a block diagram illustrating an example embodiment of a key generator.

FIG. 2 is a block diagram illustrating the key generator 110, in accordance with an example embodiment. The key generator 110 may include a key ID and key value generator 202 and a key ID and key value display module 204.

Figure 4:
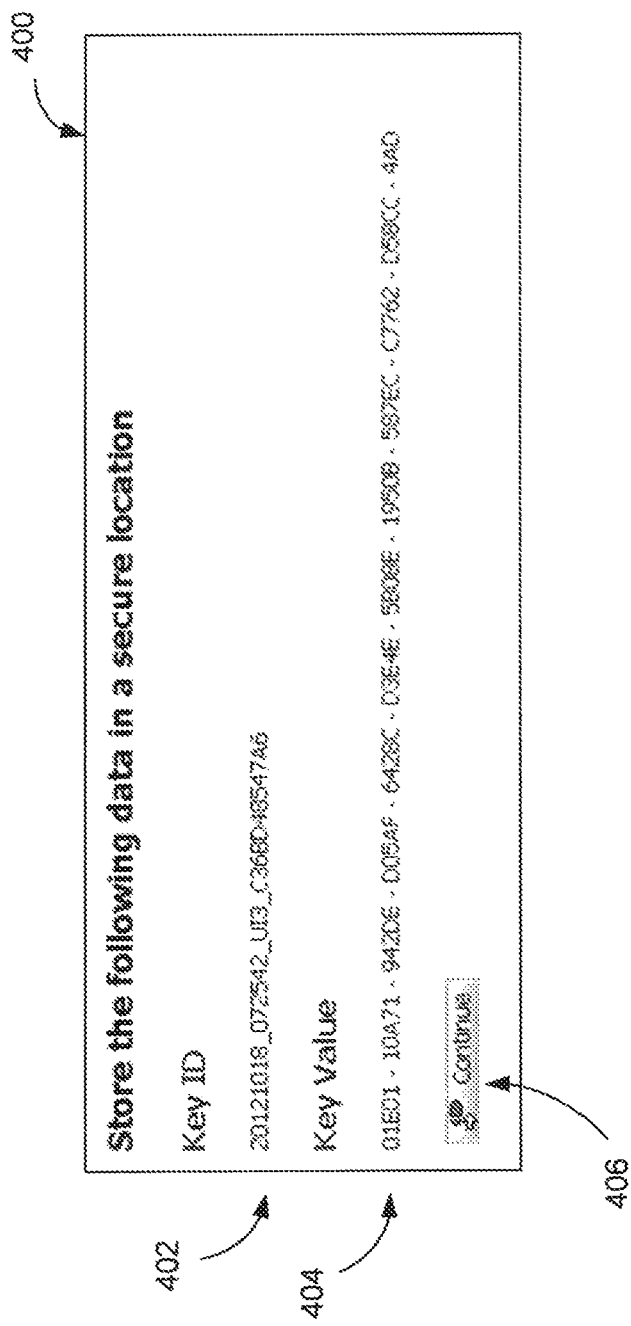
FIG. 4 is a block diagram illustrating an example embodiment of a display generated by a key generator.

As previously described, the cryptographic key consists of the key identification and the key value. The key ID and key value generator 202 generates the key identification and the corresponding key value for a corresponding application or service. In one example, the key identification identifies the cryptographic key and comprises a series of letters and numbers. (e.g., "20121018_072542_UI3_C36BD48547A6" as illustrated in FIG. 4).

The corresponding key value may include a series of letters and numbers. In one example, the corresponding key value includes hexadecimal values (e.g., numbers from 0 to 9 and letters from A to F). Other base schemes may be used for the corresponding key value.

The key ID and key value display module 204 may generate a display to present the key identification and the corresponding key value to the client. FIG. 4 illustrates an example of such a display having a dialog box or window 400. The dialog box 400 may display the key identification (labeled "key ID") 402 and the corresponding, key value 404. A "continue" button 406 enables a user at the client machine 102 to confirm and acknowledge the display of the key identification 402 and the corresponding key value 404 back to the server machine 108.

Returning back to FIG. 3, the key verification application 112 may include a key confirmation query display module 302, a key value query module 304, and a key value verification module 306.

Figure 5:
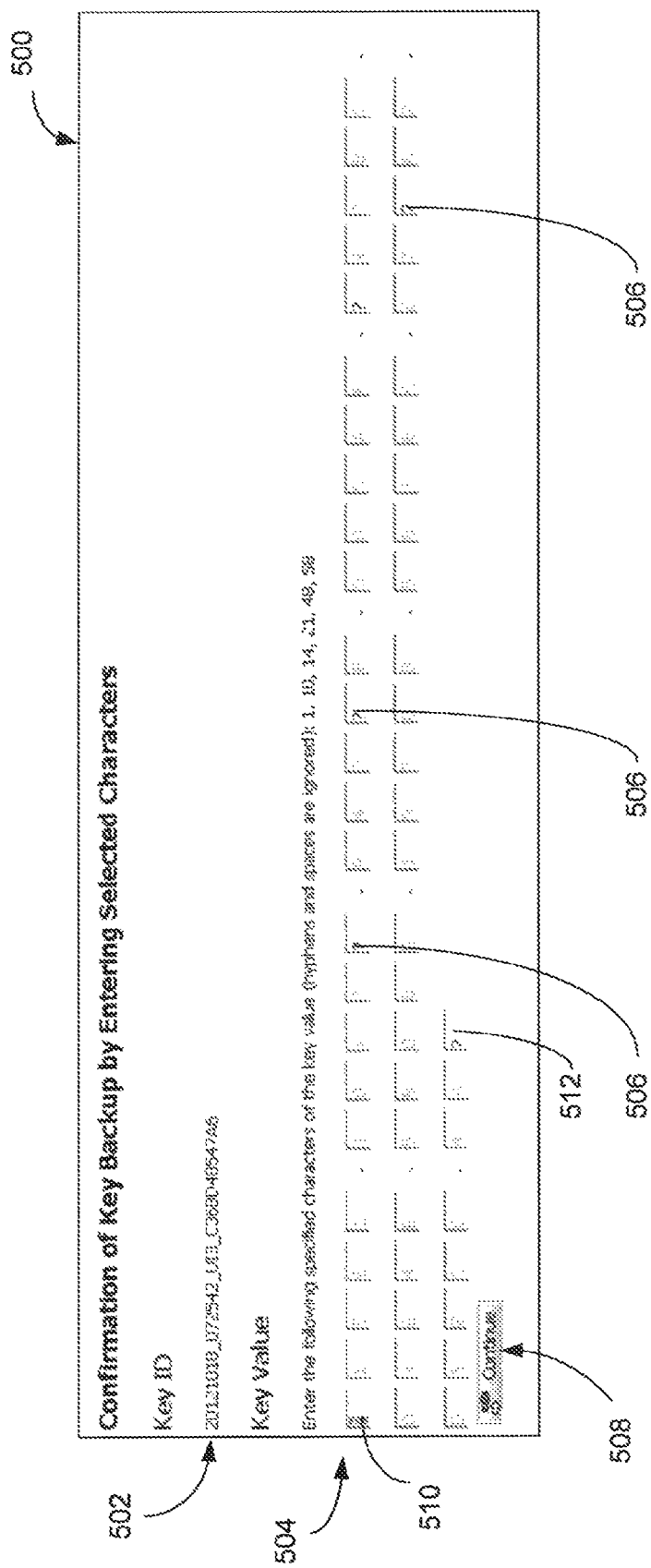
FIG. 5 is a block diagram illustrating an example embodiment of a query display generated by a key verification application.

The key confirmation query display module 302 may generate a second display that replaces the first display generated by the key ID and key value display module 204. After the client machine 102 acknowledges receiving the cryptographic key with a user pressing on the "continue" button 406 of FIG. 4, the key confirmation query display module 302 replaces the first display with the second display. FIG. 5 illustrates an example of the second display having a dialog box or window 500. The dialog box 500 displays the key identification (labeled "key ID") 502 and portions of a key value 504 with values missing from locations 506 of the portions of the corresponding key value 504. In one example embodiment, one or more values of the corresponding key value 504 are displayed to guide a user at the client machine 102 in determining the requested values (i.e., locations 510, 506, and 512).

Figure 3:
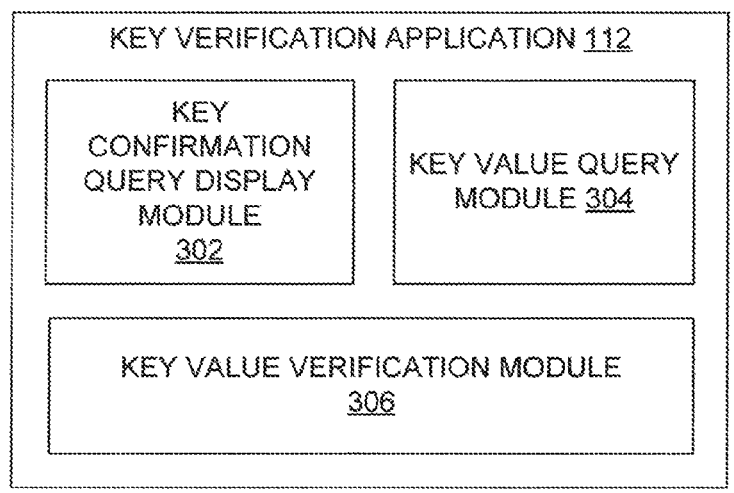
FIG. 3 is a block diagram illustrating an example embodiment of a key verification application.

The key value query module 304 of FIG. 3 may randomly select a number of locations or positions in the key value 504 to be queried. For example, the first location 510, the last location 512, and other locations 506 of the key value 504 are missing and are indicated as being queried by a question mark. One advantage of selecting a first location 510 (first position in the key value 504) and the last location 512 (last position in the key value 504) is to detect an incomplete key backup. In other words, the user needs to have a backup copy of the entire key value to be able to determine the first location 510 and the last location 512. The other locations 506 may be randomly selected. The second display thus includes queries in the portion of the key value 504 by asking for other locations 506, represented by question marks. The only button in the dialog box 500 is a "continue" button 508 that enables a user at the client machine 102 to submit the requested values at the corresponding locations of the key value 504 back to the server machine 108. As illustrated in FIG. 5, there are no "back" button for the user to return to the previous screen, window, or dialog box that previously displayed the cryptographic key.

The key value verification module 306 may then validate the entries from the client machine 102 by comparing the entries at the requested locations (i.e. locations 510, 506, and 512) with the values at the corresponding locations in the key value 504. In the example of FIG. 5, the entry from the client machine 102 for the value in first location 510 is compared with the value of "0" from the key value 404 in FIG. 4 to determine whether both values match. Similarly, the entry from the client machine 102 for the value in last location 512 is compared with the value of "D" from the key value 404 in FIG. 4 to determine whether both values match. As such, the key value verification module 306 verifies that all queried values from the key value 504 match the originally, previously displayed key value 404. The entries from the client machine 102 are validated when the key value verification module 306 matches all the queried values with the key value 404. In one example embodiment, the key value verification module 306 stores the validated cryptographic key in the storage device 114 after successful validation of the entries from the client machine 102.

Figure 6:
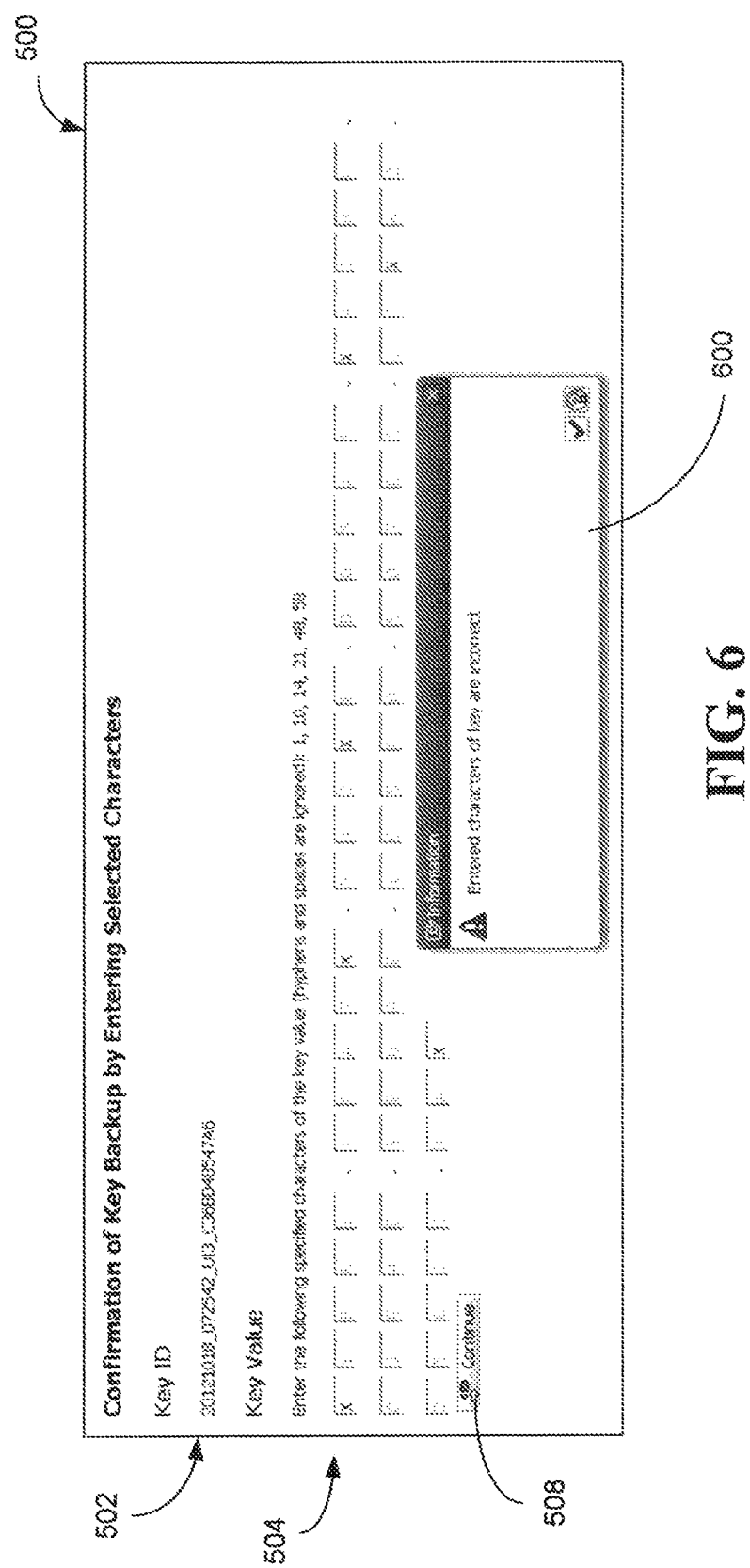
FIG. 6 is a block diagram illustrating another example embodiment of a query display generated by a key verification application.

If the key value verification module 306 finds that one or more queried entries from the client machine 102 do not match the corresponding values in the key value 404, the key value verification module 306 may generate a notification of the mismatch. FIG. 6 illustrates an example of a dialog box 600 presented or displayed on top of and/or in front of the dialog box 500. The dialog box 600 informs the client machine 102 that the entered characters of the cryptographic key are incorrect. In one example embodiment, the dialog box 600 does not offer the client machine 102 to go back and resubmit the same cryptographic key a second time. In another example embodiment, the dialog box 600 may allow the client machine 102 to try one or more time to resubmit entries for values at different locations of the key value 504. In yet another example embodiment, the cryptographic key may be discarded after the entries from the client machine 102 are unsuccessfully validated. A new cryptographic key may be generated and the process may be reiterated, starting again with the display of the key value of the new cryptographic key. A new cryptographic key may be generated every time the client machine 102 fails to correctly validate the entries from the client machine 102.

Example Operation of the Key Generator and Key Verification

Figure 7:
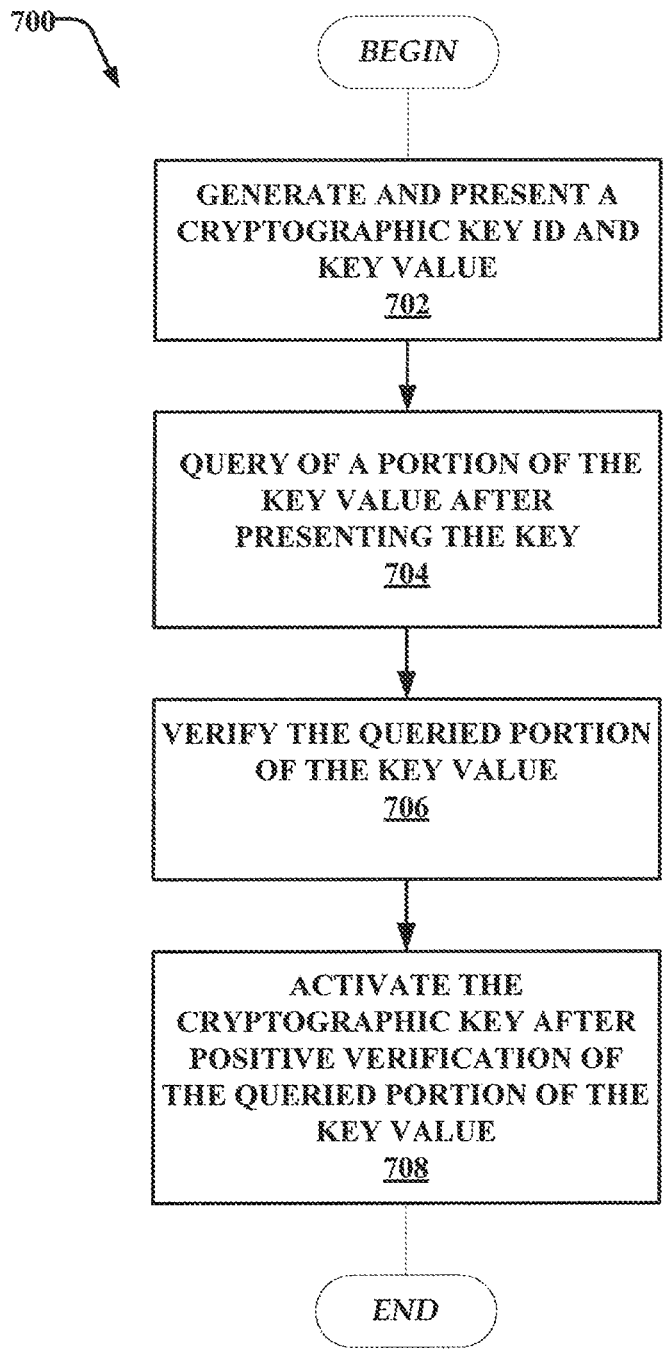
FIG. 7 is a flowchart of a method, in accordance with an example embodiment, for generating, verifying, and activating a cryptographic key.

FIG. 7 is a flowchart of a method 700, in accordance with an example embodiment, for generating, verifying, and activating a cryptographic key. At operation 702, a cryptographic key is generated for a client at a server and presented to the client. The cryptographic key may include a key identification and a corresponding key value. In one embodiment, a key ID and key value generator 202 of a key generator in a server generates the cryptographic key. A key ID and key value display module of the key generator presents the key identification and the corresponding key value in a dialog box or a window to the client.

At operation 704, a query of a portion of the key value is generated for the client after presenting a display of the cryptographic key in operation 702. In one embodiment, the key value query module generates a query for the client for values of the key value at random locations of the key value.

At operation 706, the queried portion of the key value is verified. In one embodiment, a key value verification module receives entries from the client in response to the query and compares those entries against the key value to validate the entries.

At operation 708, the cryptographic key is activated after the entries from the client are validated. In one embodiment, the key value verification module activates the cryptographic key and stores the key in a storage device.

Figure 8:
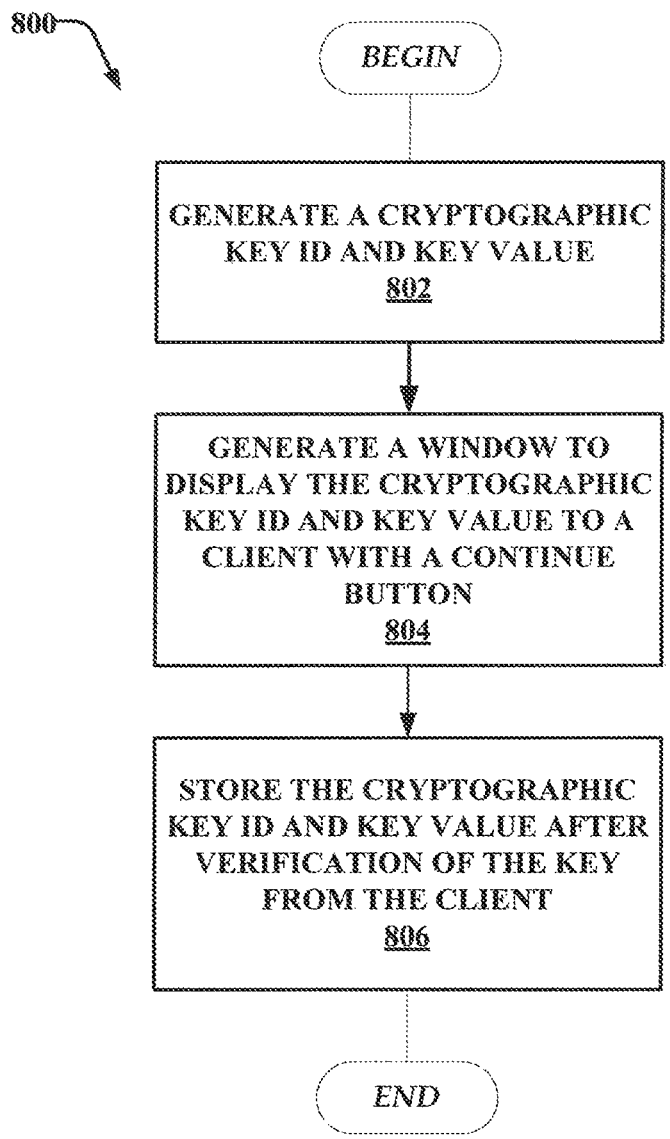
FIG. 8 is a flowchart of a method, in accordance with an example embodiment, for generating and display a cryptographic key.

FIG. 8 is a flowchart of a method 800, in accordance with an example embodiment, for generating and displaying a cryptographic key. At operation 802, a cryptographic key is generated for a client at a server and presented to the client. The cryptographic key may include a key identification and a corresponding key value. In one embodiment, a key ID and key value generator of a key generator in a server generates the cryptographic key.

At operation 804, a first display comprising the key identification and the corresponding key value is generated. In one embodiment, a key ID and key value display module of the key generator generates the first display for the client. The display may include a continue button.

At operation 806, the cryptographic key is stored in the server after successfully validating the entries from the client. In one embodiment, a key value verification module directs the key generator to store the cryptographic key in the storage device.

Figure 9:
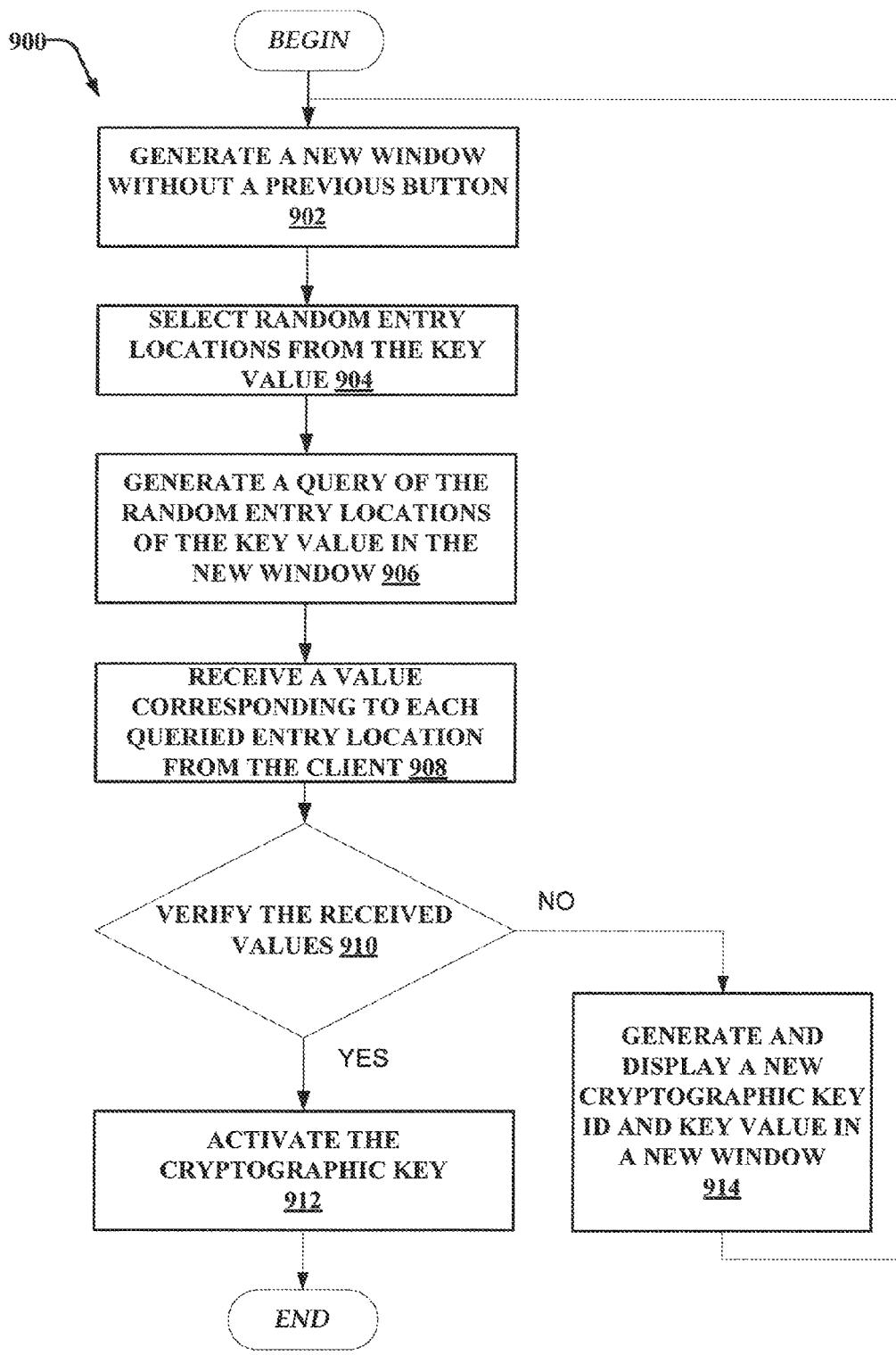
FIG. 9 is a flowchart of a method, in accordance with an example embodiment, for verifying key values of a cryptographic key.

FIG. 9 is a flowchart of a method 900, in accordance with an example embodiment, for verifying key values of a cryptographic key. At operation 902, a new window or dialog box is generated without a "previous" or "back" button. In other words, the client cannot retrieve the previous dialog box that displayed the values of the cryptographic key. In one embodiment, after displaying the values of the cryptographic key and receiving an acknowledgement from the client (e.g., "continue" button), the new window or dialog box replaces the previous dialog box that displayed the values of the cryptographic key. In one embodiment, a key confirmation query display module of a key verification application generates the new dialog box.

At operation 904, random locations or positions in the key value are selected. The key value includes a sequence of a combination of letters and numbers. In one embodiment, a key value query module of the key verification application may select the first and the last position for the query. The random positions may be located between the first and last position in the key value.

At operation 906, a query for the values at the random locations or positions of the key value is generated and submitted to the client. In one embodiment, the key value query module of the key verification application generates the query in the form of question marks or empty fields for the corresponding location of the key value.

At operation 908, entries corresponding to the random locations are received from the client. In one embodiment, the key value verification module of the key verification application receives the entries from the client.

At operation 910, the received entries are compared against the values at the corresponding locations of the cryptographic key. In one embodiment, the comparison may be implemented with the key value verification module of the key verification application.

At operation 912, after successfully validating the received entries, the cryptographic key is activated and stored if the received entries match the values at the corresponding locations of the cryptographic key. In other words, the key value verification module of the key verification application marks or indicates the cryptographic key corresponding to the client as valid in the storage device.

At operation 914, after unsuccessfully validating the received entries, the cryptographic key is discarded and a new cryptographic key is generated and displayed. The process then reiterates with operation 902. In one embodiment, the key value verification module of the key verification application directs the key generator to discard and generate a new cryptographic key.

Computer Modules

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g. programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Computer System

Figure 10:
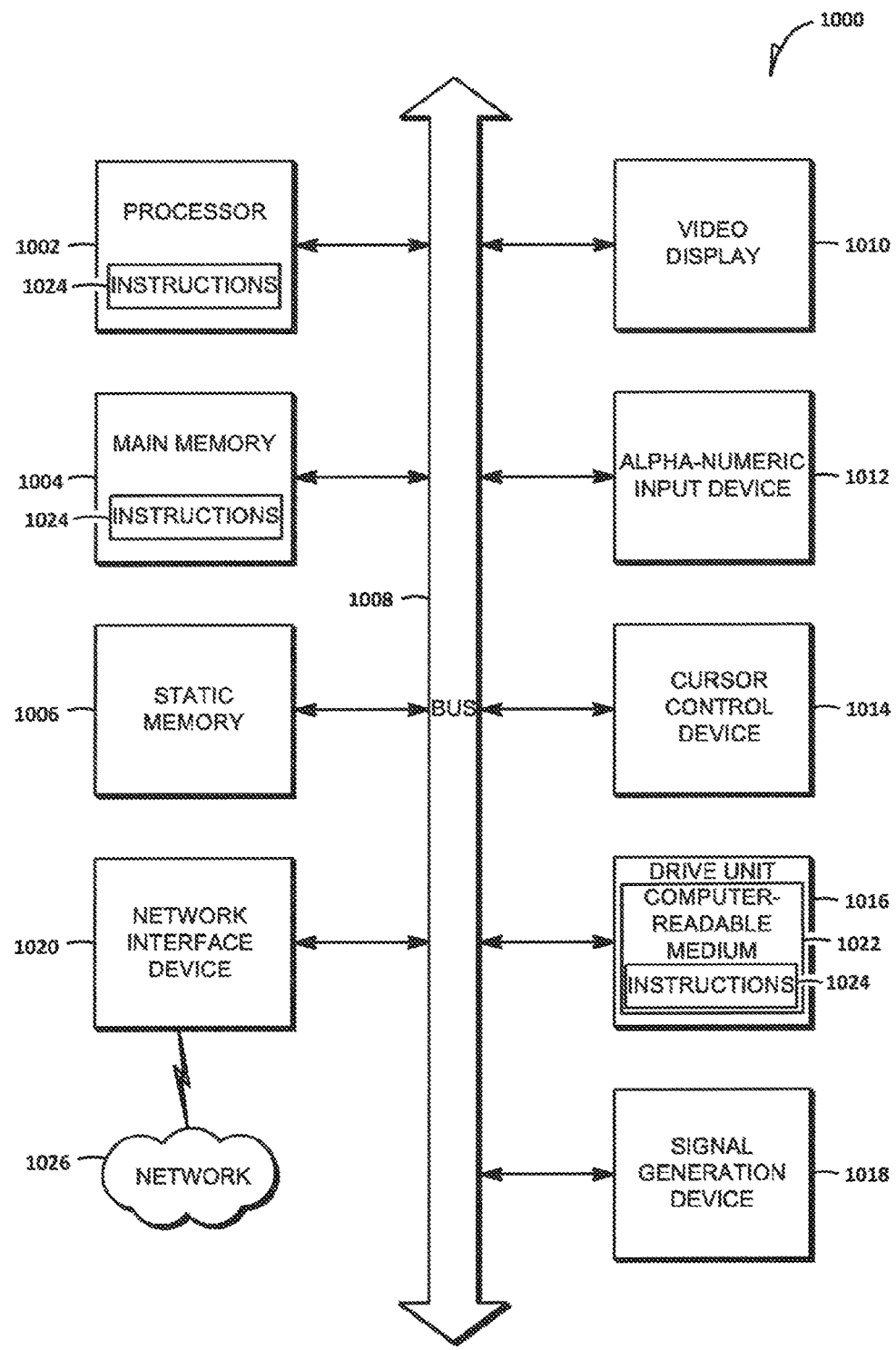
FIG. 10 is a block diagram of a machine in an example form of a computing system within which a set of instructions for causing the machine to perform any one or more of the methodologies discussed herein may be executed.

With reference to FIG. 10, an example embodiment extends to a machine in the example form of a computer system 1000 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 may include a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). In example embodiments, the computer system 1000 also includes one or more of an alphanumeric input device 1012 (e.g., a keyboard), a user interface (UI) navigation device or cursor control device 1014 (e.g., a mouse), a disk drive unit 1016, a signal generation device 1018 (e.g., a speaker), and a network interface device 1020.

The disk drive unit 1016 includes a machine-readable storage medium 1022 on which is stored one or more sets of instructions 1024 and data structures (e.g., software instructions) embodying or used by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media.

While the machine-readable storage medium 1022 is shown in an exemplary embodiment to be a single medium, the term "machine-readable storage medium" may include a single storage medium or multiple media (e.g., a centralized or distributed database, or associated caches and servers) that store the one or more instructions 1024. The term "machine-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present invention.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A method comprising:
   generating a cryptographic key for a client at a server, the cryptographic key having a key identification and a corresponding key value;
   presenting the key identification and the corresponding key value to the client;
   generating a query of a portion of the corresponding key value for the client after the presenting;
   receiving a first plurality of entries including the portion of the corresponding key value from the client in response to the query;
   activating the cryptographic key after validating the first plurality of entries from the client;
   generating a first display comprising the key identification and the corresponding key value;
   in response to receiving a first acknowledgement from the client of the first display, replacing the first display with a second display comprising the query of the portion of the key value;
   selecting a plurality of random locations in the key value, the key value comprising a sequence of a combination of letters and numbers;
   querying a corresponding value at the random locations; and
   receiving entries for the random locations from the client.

2. The method of claim 1, further comprising:
   selecting a first location and a last location in the key value to query.

3. The method of claim 1, further comprising:
   generating a single button in the second display, the single button configured to submit the queried corresponding values at the random locations to the server.

4. The method of claim 1, further comprising:
   validating the first plurality of entries from the client by comparing the entries for the random locations with the corresponding value at the random locations in the key value.

5. The method of claim 4, further comprising:
   storing the cryptographic key in the server after successfully validating the first plurality of entries from the client.

6. The method of claim 4, further comprising:
   discarding the cryptographic key after unsuccessfully validating the first plurality of entries from the client;
   generating a new cryptographic key;

presenting the new cryptographic key to the client;
generating a second query of a portion of the new cryptographic key or the client after the presenting;
receiving a second plurality of entries from the client in response to the second query; and
activating the new cryptographic key after validating the second plurality of entries from the client.

7. A server comprising:
a processor comprising a key generator and a key verification application,
the key generator configured to generate a cryptographic key for a client, the cryptographic key having a key identification and a corresponding key value, to present the key identification and the corresponding key value to the client;
the key verification application configured to generate a query of a portion of the key value for the client, to receive a first plurality of entries including the portion of the corresponding key value from the client in response to the query, and to activate the cryptographic key after validating the first plurality of entries from the client;
a storage device configured to store the cryptographic key after the entries are successfully validated from the client;
key generator is configured to generate a first display comprising the key identification and the corresponding key value, and in response to receiving a first acknowledgement from the client of the first display, to replace the first display with a second display comprising the query of the portion of the key value; and
key verification application is configured to select a plurality of random locations in the key value, the key value comprising a sequence of a combination of letters arid numbers, to query a corresponding value at the random locations, and to receive the entries for the random locations from the client.

8. The server of claim 7, wherein the key verification application is configured to select a first location and a last location in the key value to query.

9. The server of claim 7, wherein the key verification application is configured to generate a single button in the second display, the single button configured to submit the queried corresponding values at the random locations to the server.

10. The server of claim 7, wherein the key verification application is configured to validate the first plurality of entries from the client by comparing the entries for the random locations with the corresponding value at the random locations in the key value.

11. The server of claim 10, wherein the key generator is configured to store the cryptographic key in the server after the first plurality of entries from the client are successfully validated.

12. The server of claim 10, wherein the key verification application is configured to discard the cryptographic key after unsuccessfully validating the first plurality of entries from the client, to generate a new cryptographic key, to present the new cryptographic key to the client, to generate a second query of a portion of the new cryptographic key for the client after the presenting, to receive a second plurality of entries from the client in response to the second query, and to activate the new cryptographic key after validating the second plurality of entries from the client.

13. A non-transitory machine-readable storage medium storing instructions which, when executed by at least one processor, performs operations comprising:
generating a cryptographic key for a client at a server, the cryptographic key having a key identification and a corresponding key value;
presenting the key identification and the corresponding key value to the client;
generating a query of a portion of the key value for the client after the presenting;
receiving a first plurality of entries including the portion of the corresponding key value from the client in response to the query;
activating the cryptographic key; after validating the first plurality of entries from the client;
generating a first display comprising the key identification and the corresponding key value; and
in response to receiving a first acknowledgement from the client of the first display, replacing the first display with a second display comprising the query of the portion of the key value;
selecting a plurality of random locations in the key value, the key value comprising a sequence of a combination of letters and numbers;
querying a corresponding value at the random locations; and
receiving the first plurality of entries for the random locations from the client.

14. The non-transitory machine-readable storage medium of claim 13, further comprising:
storing the cryptographic key in the server after successfully validating the first plurality of entries from the client;
discarding the cryptographic key after unsuccessfully validating the first plurality of entries from the client;
generating a new cryptographic key;
presenting the new cryptographic key to the client;
generating a second query of a portion of the new cryptographic key for the client after the presenting;
receiving a second plurality of entries from the client in response to the second query;
and
activating the new cryptographic key after validating the second plurality of entries from the client.

* * * * *